(No Model.)  2 Sheets—Sheet 1.

C. W. OLDREIVE.
TRICYCLE.

No. 245,012.  Patented Aug. 2, 1881.

Witnesses
S. N. Piper
E. P. Pratt

Inventor
Charles Wood Oldreive.
by R. H. Eddy atty.

(No Model.) 2 Sheets—Sheet 2.

C. W. OLDREIVE.
TRICYCLE.

No. 245,012. Patented Aug. 2, 1881.

Witnesses.

Inventor.
Charles Wood Oldreive
by R. H. Eddy atty.

UNITED STATES PATENT OFFICE.

CHARLES W. OLDREIVE, OF CHELSEA, MASSACHUSETTS.

TRICYCLE.

SPECIFICATION forming part of Letters Patent No. 245,012, dated August 2, 1881.

Application filed June 7, 1881. (No model.)

*To all whom it may concern:*

Be it known that I, CHARLES WOOD OLDREIVE, of Chelsea, of the county of Suffolk, and State of Massachusetts, have invented a new and useful Improvement in Tricycles; and I do hereby declare the same to be described in the following specification and represented in the accompanying drawings, of which—

Figure 1:
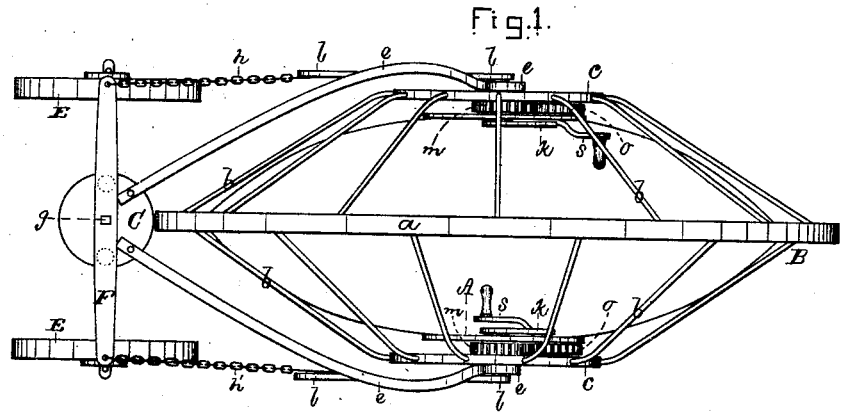
Figure 3:
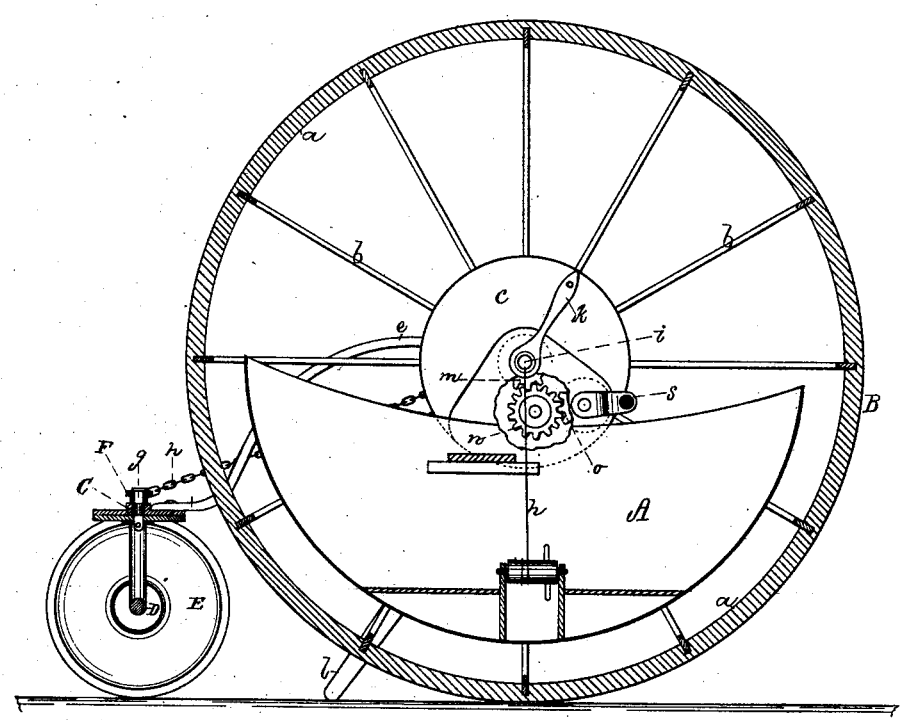
Figure 4:
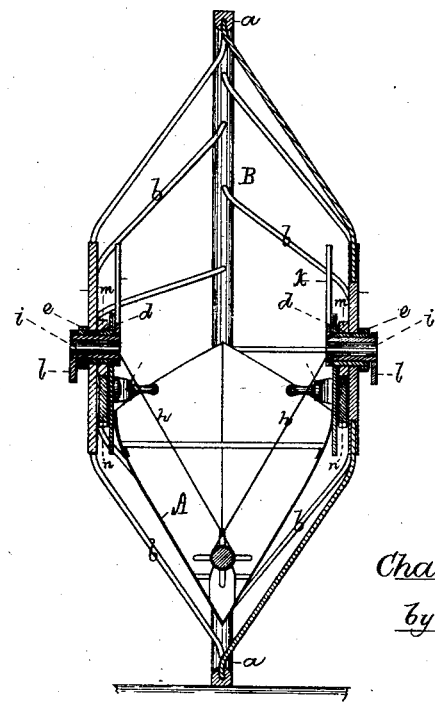

Figure 1 is a top view, Fig. 2 a side elevation, Fig. 3 a longitudinal section, and Fig. 4 a transverse section, of a tricycle containing my invention, the nature of which is defined in the claim or claims hereinafter presented.

In the said tricyle a platform-car or a carrier-body, A, in the form of a boat, is wholly within the driving-wheel B, which has to its rim $a$ two separate sets of spokes, $b$, and two separate hubs, $c\ c$, all arranged as shown.

Tubular journals $d\ d$ project from opposite sides of the body A through the hubs of the wheel, and fixed to the said journals are the prongs $e\ e$ of a furcated perch, C, such perch being pivoted to an axle, D, provided with two bearing-wheels, E E. The pivot $g$ of the perch and axle has fixed on its upper part a cross-bar or yoke, F, to whose outer ends or parts steering-lines $h\ h'$ are fastened, and thence are led to and through two tubes, $i\ i$, arranged concentrically within the tubular journals $d\ d$, and thence into the car or body A.

Each of the tubes $i$ has an arm, $k$, fastened to and extended up from it at its inner end, and, furthermore, such tube also has another but longer arm, $l$, projecting down from it to the ground. Each tube $i$, with its two arms, $k\ l$, constitutes a brake for arresting the movements of the tricycle, as occasion may require, all of which, while the vehicle may be in motion, can be effected by the rider by grasping the two arms $k$ and moving them so as to force the arms $l\ l$ into close contact with the ground.

Figure 2:
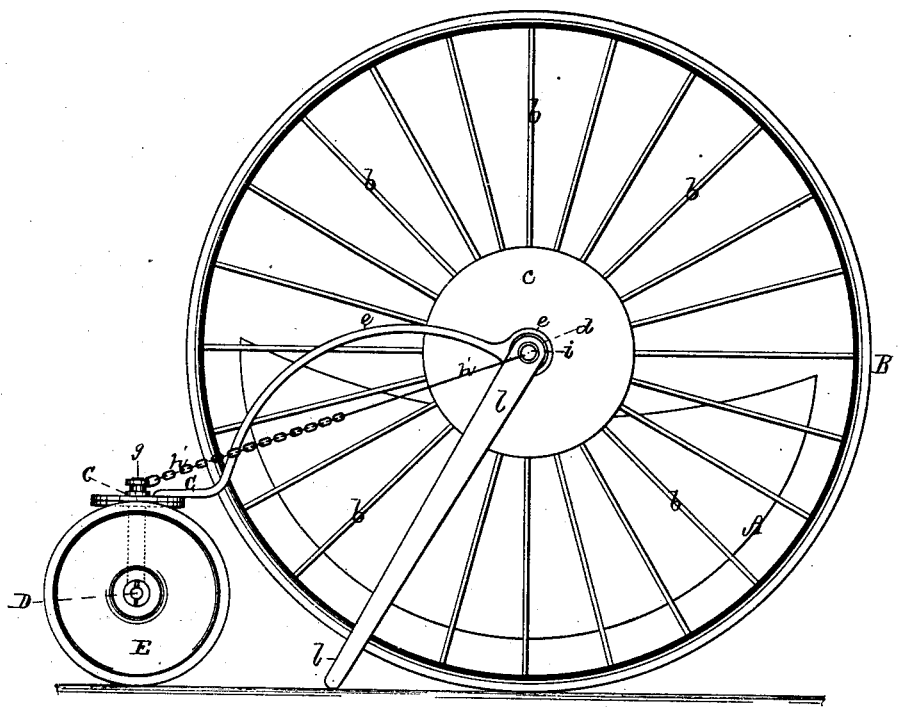

Each hub of the wheel has fixed to it on its inner side and concentric with such hub a gear, $m$, which engages with a driving-gear, $o$, by means of an intermediate gear, $n$, such gears being shown in dotted lines in Fig. 2. The said intermediate and driving gears are applied to the car so as to be capable of being revolved by a crank, $s$, fixed on the arbor of the driving-gear.

A person, while either sitting or standing within the car, can readily put the vehicle in motion either backward or forward by taking hold of and simultaneously revolving the two cranks, and he can change the direction of the motion by pulling on either of the steering-lines, so as to cause the axle of the supplementary wheels to assume an oblique position to the plane of the wheel B.

From the above it will be seen that, owing to the large diameter which may be given to the wheel B, the vehicle can be run at a very high degree of speed and be easily manipulated by a person when within the car.

I do not confine my invention to the precise shape or construction of the car as shown, for such may be materially varied without changing the character of the improvement.

What I claim as my invention is as follows, viz:

1. The combination of the main or driving wheel B, provided with the rim, two hubs, and two sets of spokes, as set forth, with the car or carriage body A, and its tubular journals arranged within such wheel, and with the perch C, auxiliary wheels E E, and their axle D, all being adapted substantially as set forth, the said wheel B and car A being provided with means or mechanism to enable a person while in the car to revolve the wheel, in order to put the tricycle in movement.

2. The combination of the tubes $i$ and their arms $k\ l$, with the wheel B and car A, all being constructed and applied substantially as set forth.

3. The combination of the steering-yoke F and lines $h\ h$ with the main wheel B, the auxiliary wheels E E, and axle D, the car A, and perch C, arranged and adapted substantially as set forth, the said lines being led into the said main wheel through tubes $i$ within the tubular journals $d\ d$, projecting from the car, and all being essentially as specified.

4. The tricycle, substantially as described, consisting of the car A, main wheel B, furcated perch C, auxiliary wheels E E, their axle D, steering-yoke F, lines $h\ h$, brake-tubes $i\ i$, and their arms $k\ k\ l\ l$, and the mechanism for revolving the main wheel, all being constructed, arranged, and adapted essentially in manner as represented, and to operate as described.

CHARLES WOOD OLDREIVE.

Witnesses:
R. H. EDDY,
E. B. PRATT.